June 4, 1940.  J. R. GINNATY  2,203,138
SPRINKLER CONTROL SYSTEM
Filed Aug. 8, 1938
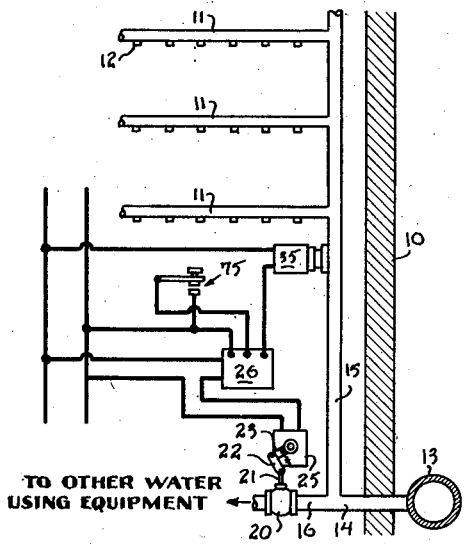
Fig. 1
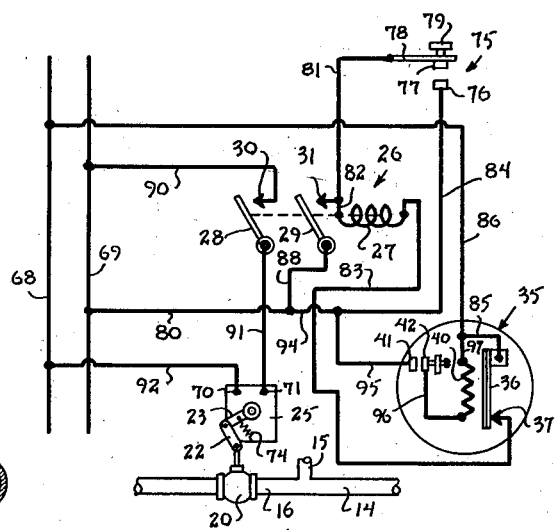
Fig. 2
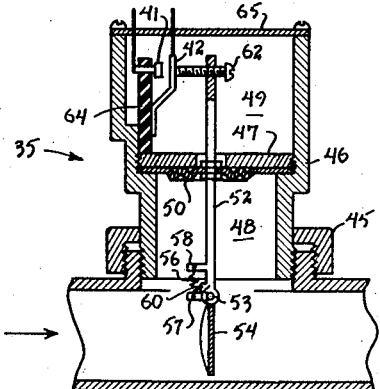
Fig. 3
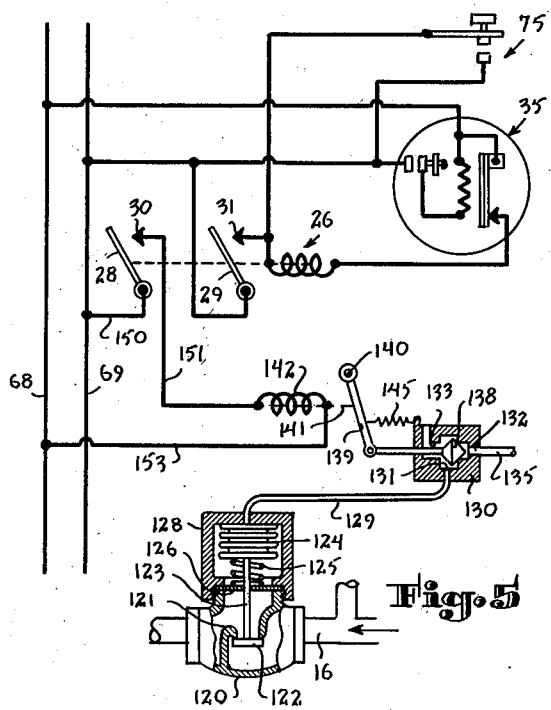
Fig. 4
Fig. 5
Inventor
John R. Ginnaty
By George H. Fisher
Attorney Patented June 4, 1940

2,203,138

UNITED STATES PATENT OFFICE 2,203,138

SPRINKLER CONTROL SYSTEM

John R. Ginnaty, Villa Park, Ill., assignor to Minneapolis-Honeywell Regulator Company, Minneapolis, Minn., a corporation of Delaware Application August 8, 1938, Serial No. 223,639

19 Claims. (Cl. 169—16)

This invention relates to an automatic control system for a water distribution system of the type which includes an automatic sprinkler system provided for fire extinguishing purposes in a building.

In many existing structures equipped with an automatic sprinkler system, the water main leading to the building is of sufficient size to supply the proper amount of water to the system as long as there is not a great deal of other water using equipment in the building which may be simultaneously drawing on the water supply. In such structures which were originally built without and air conditioning equipment, it is frequently desirable to modernize the building by the installation of an air conditioning system.

Many popular types of air conditioning equipment require the use of a large amount of water for washing, cooling, and humidifying the air. Where such equipment is installed in a building which was not originally designed with such an installation contemplated, the size of the water main leading to the building is frequently such that where the building is equipped with a sprinkler system, if a fire should break out in the building while the air conditioning system is in operation, the air conditioning system may be using such a large amount of water that insufficient water may be available for properly supplying the sprinkler system, thus dangerously reducing its effectiveness.

In order to overcome this dangerous condition, it is generally necessary, when air conditioning equipment is installed in such a building, to take out the existing water main and install a main having sufficient capacity to simultaneously supply the air conditioning apparatus and whatever other water using equipment may be in the building, and the sprinkler system, or else to provide a separate main for supplying water to the air conditioning apparatus so as not to reduce the supply available at the sprinklers. The replacement of the existing water main with a new and larger one, or the installation of an additional main for supplying the air conditioning equipment may be such an expensive undertaking as to discourage the installation of air conditioning equipment.

One of the objects of my invention is in the provision of means to overcome the necessity of providing a new or additional water main in such buildings upon the installation of air conditioning equipment while insuring that there will be an adequate flow of water to the sprinkler system upon such system being placed in operation by the existence of a fire within the building.

More specifically it is an object of my invention to provide means for automatically shutting off the flow of water to all the water using equipment in the building with the exception of the sprinkler system when the sprinkler system is placed in operation so that a water main having insufficient capacity to simultaneously supply the sprinkler system and other water using equipment in the building may be safely employed.

It should be understood that my invention finds its usefulness not only when air conditioning apparatus is to be installed in a building, but whenever the water main leading to a building to be modernized is of insufficient size to simultaneously supply the sprinkler system and whatever other water using appliances it may be desired to install within the building.

Other objects and advantages will become apparent upon a study of the specification, claims, and appended drawing, wherein like reference characters represent like parts in the various views and wherein, Figure 1 is a schematic view of a water distribution system embodying my invention.

Figure 2 is a detailed view of the wiring shown in Figure 1,

Figure 3 is a cross sectional view of the flow controlled switch of Figure 2.

Figure 4 is a modification of the electrical apparatus of Figure 2, and

Figure 5 is a diagrammatic view of a pneumatic system as applied to my invention.

Referring more particularly to Figure 1, the reference character 10 illustrates an exterior wall of a building within which are suitably located a plurality of sprinklers 11. The sprinklers 11 are provided with sprinkler nozzles 12 which may be of any suitable construction and are of a type which permits flow of water from the sprinklers in response to an abnormal rise in temperature adjacent the sprinklers such as is caused by a fire within the building. The reference character 13 designates a water supply pipe in the street and to this pipe is connected a main 14 for supplying water to the building. The pipe 15 conducts water from the main 14 to the sprinklers 11 and the pipe 16 also connected to the main 14 may be connected to other water using appliances in the building such as air conditioning apparatus, etc.

The flow of water through the pipe 16 and all the water using appliances with the exception of the sprinklers 11 may be controlled by a valve 20. This valve includes a valve stem 21 which may be connected by means of a link 22 to an arm 23 operated by a motor 25. The operation of the motor 25 is controlled by a relay 26 and as seen in Figure 2 this relay includes a relay coil 27, and switch arms 28 and 29 cooperating with fixed contacts 30 and 31, respectively. Energization of the relay coil 27 causes movement of the switch arms into engagement with the contacts 30 and 31 and upon deenergization of this coil the arms are moved out of engagement with their respective contacts under the influence of gravity or any suitable biasing means (not shown).

A flow controlled switch 35 is provided for controlling the energization of the relay 26. This switch may include a bimetallic element 36 biased into engagement with a fixed contact 37 and arranged adjacent the bimetallic element is a heating element 40. When power is supplied to the heating element 40 the bimetallic element 36 heats up and after a short period of time it moves away from the fixed contact 37. The energization of the heating element 40 is controlled by the contacts 41 and 42. As will be hereinafter set out engagement of the movable contact 42 with the fixed contact 41 closes a circuit through the heating element 40.

Referring now to Figure 3 the construction of this flow switch is illustrated. The pipe 15 receives by means of a suitable fitting 45 a casing 46 divided by means of a partition 47 into a lower compartment 48 and an upper compartment 49. The lower compartment 48 is in open communication with the pipe 15 and a flexible wall 50 held in place by means of the partition 47 prevents communication between the two compartments. Suitably carried by the flexible wall 50 is a rod 52 to which is pivoted at 53 a vane 54. The vane 54 is curved and has a radius of curvature the same as that of the pipe 15. A spring 56 connects an arm 57 rigid with the vane 54 to an arm 58 rigid with the rod 52, this spring forming a strain release connection. A suitable stop 60 limits pivotal movement of the vane 54 under the influence of the spring 56 so that its normal position will be transverse to the axis of the pipe as illustrated. When water flows through the pipe in the direction of the arrow the vane 54 will move toward the right and move the arm 52 with it as far as this arm can go, this movement being permitted by reason of its mounting on the flexible wall 50. Further movement of the vane 54 is permitted by reason of the strain release connection formed by the spring 56 and this vane can therefore assume a position wherein it lies flat against the inner wall of the pipe 15.

Carried by the upper end of the rod 52 is an adjustable screw 62 which bears against the movable contact member 42. This movable contact and the fixed contact 41 are both carried by the insulated member 64 suitably secured to the inner wall of the upper compartment 49. Upon movement of the rod 52 with the vane 54 in response to a flow of water through the pipe the screw 62 carried by the upper portion of the rod 52 forces the movable contact 42 into engagement with the fixed contact 41. The top of the casing 46 may be closed by a suitable cover member 65 suitably secured to the top of the casing. While they are not illustrated in this view, it will be understood that the bimetallic contact element 36, the fixed contact 37, and the heater 40 may also be located in the upper compartment 49.

This flow switch per se forms no part of the present invention and other suitable forms of a flow switch may be substituted therefor.

Lines 68 and 69 may be connected to a suitable source of power (not shown) and are provided for furnishing power to the valve motor 25, the relay 26, and the heater 40 in the flow switch. The motor 25 for operating the valve 20 is provided with terminals 70 and 71. When power is supplied to these terminals the arm 23 is rotated in a clockwise direction and through the link 22 moves the valve 20 to open position wherein it is held as long as power is supplied to the motor. As soon as the power supply to the motor is interrupted the spring 74 moves the arm 23 of the motor downwardly and causes the valve 20 to be closed.

With the parts in the position shown in Figures 1 and 2 the valve 20 is closed so that no water can flow to the air conditioning apparatus and other water using appliances connected to the main 14. The sprinklers 11 however are always in communication with the main 14 but as illustrated these sprinklers are all closed. In order to open the valve 20 a normally open switch 75 is provided. This switch includes a fixed contact 76 and a movable contact 77 carried by a spring arm 78 which is in turn provided with a knob 79 by means of which the switch may be closed. If the switch 75 is now closed, the relay 26 will be energized through the following circuit: from the line wire 69 through conductors 80, 94, 84, contacts 76 and 77, conductors 81 and 82, the relay coil 27, conductor 83, contact 37, bimetallic element 36, and conductors 85 and 86 to the line wire 68. Assuming that the bimetallic element is in its normal engagement with the fixed contact 36 the relay will remain energized by the following holding circuit established by movement of arm 29 into engagement with the contact 31, after the manually operated switch 75 is allowed to open: from the line wire 69 through conductors 80, 88, switch arm 29, contact 31, conductor 82, relay coil 27, conductor 83, contact 37, bimetallic element 36, and conductors 85 and 86 to the line wire 68. It will accordingly be seen that as long as the bimetallic element 36 stays in engagement with the fixed contact 37, the relay 26 will remain energized unless for some reason or other there be a failure in the supply of power to the relay 26 through some abnormal situation. If this failure in the power supply occurs the switch 75 must again be operated before energization of the relay 26 will take place.

The energization of the relay 26 causes movement of the arm 28 into engagement with the contact 30 whereupon power is supplied to the motor 25 as follows: from the line wire 69 through conductor 90, fixed contact 30, arm 28, conductor 91, motor 25, and conductor 92 to the line wire 68. Energization of the motor 25 permits flow of water to the various equipment throughout the building.

Should a fire now break out in any part of the building thereby automatically opening any one of the sprinklers 11, water will flow through the pipe 16 and by means of the vane 54 will move the contact 42 into engagement with the contact 41 as heretofore explained. When this occurs current flows through the heating element 40 of the flow switch as follows: from the line wire 69 through conductors 80, 94, 95, contacts 41 and 42, conductor 96, heating element 40, and conductors 97 and 86 to the line wire 68. If this heating element 40 is energized for a sufficient length of time which need not be very long but may be for a matter of seconds, the bimetal element 36 will be heated up and will flex away from the fixed contact 37. As soon as this happens the circuit to the relay 26 is interrupted whereupon the switch arms 28 and 29 move away from their respective contacts, the movement of the arm 28 away from contact 30 interrupting the circuit to the motor 25. The spring 74 therefore causes valve 20 to be moved to closed position so that all the water in the main 14 is now available at the sprinklers 11 for fire extinguishing purposes.

The purpose of the heater 40 in providing a short time delay between the flow of water through the pipe 15 and the opening of the switch 36 is to prevent this switch from opening should there be a momentary surge of water in the pipe 15 not caused by the opening of the sprinklers 11 but which might be sufficient to momentarily move the contact 42 into engagement with the contact 41. If such a momentary surge occurred and caused immediate closure of the valve 20 it would cause considerable inconvenience in the building since manual attention would be necessary to reopen the valve 20 by the switch 75. The time delay element or heater element 40 prevents this from occurring and requires that the water flow continuously through the pipe 15 for at least a time period which would be longer than a momentary surge in the pipe before the valve 20 is closed. Since the valve 20 is held open only so long as the motor 25 is energized any interruption in the power supply in the building such as might occur upon the existence of a fire will immediately cause the closing of the valve and this insures the safe operation of the system in the event of a failure of a power supply. The switch 75 forms an additional safety feature in that the relay 26 cannot be energized and the valve 20 cannot be opened once it has been closed for any reason until the switch 75 is manually operated.

Referring now to Figure 4 the motor 25' for operating the valve 20 is a different type of motor from that shown in Figure 2. This motor is provided with three terminals 100, 101, and 102. Conductors 103 and 104 supply power to the motor 25' from the line wires 68 and 69, respectively. When the terminals 101 and 102 of this motor are connected together the motor operates to open the valve 20 and when the terminals 100 and 101 are connected together the motor 25' is again operated to positively close the valve 20 instead of relying upon a biasing means for effecting this closure as in the form of invention illustrated in Figure 2. The relay 26 which controls the operation of the motor 25' is operated in the same manner as the relay of Figure 2 and this portion of the system has therefore been omitted from Figure 4.

A second contact 105 cooperates with the arm 28 of the relay 26 and when the relay is deenergized the arm 28 moves into engagement with this contact 105. Upon energization of the relay the arms 28 and 29 move into engagement with the contacts 30 and 31 as in Figure 2. A conductor 106 connects the fixed contact 105 with the terminal 100 of the motor 25' and a conductor 107 connects the fixed contact 30 with the motor terminal 102. The arm 28 is connected by means of conductor 108 with the motor terminal 101. It will now be apparent that when the relay 26 is deenergized and arm 28 is in engagement with the contact 105, the motor terminals 100 and 101 are connected together and the valve is in its closed position. Upon energization of the relay closed position. Upon energization of the relay and movement of the arm 28 into engagement with the contact 30 the motor terminals 101 and 102 are connected together and the motor 25' operates to open the valve 20 and thereby permit the flow of water to various water using appliances within the building. Any failure of the supply of power to the relay 26 will cause the motor 25' to close the valve 20 providing the motor 25' is connected to the source of power through the conductors 103 and 104. Accordingly this system will operate safely to close the valve 20 in the event of a failure of power supply as in Figure 1 except in case the supply of power to the motor itself should be interrupted. This form of the invention has the advantage over that shown in Figure 2 in that during normal operation of the system the motor 25' positively closes the valve 20 instead of relying upon a biasing means as in Figure 2.

Referring now to the form of invention illustrated in Figure 5, a pneumatically operated valve 120 is shown for controlling the flow of water in the pipe 16. This valve is shown to comprise a valve seat 121 with which cooperates a valve element 122 provided with a valve stem 123 suitably connected with the lower wall of a bellows 124. A spring 125 is located between the bellows 124 and a plate 126 which forms the top wall of the valve chamber, and this spring normally urges the valve element 122 against the valve seat 121. A casing 128 houses the bellows and spring and through the top wall of this casing a pipe line 129 communicates with the interior of the bellows 124.

The pipe line 129 communicates at its other end with a valve 130, which valve is a three-way valve and includes ports 131, 132, and 133. A pipe 135 communicates with the port 132 and this pipe leads to a suitable source of air under pressure. Flow of air from this port is controlled by a valve element 138 and when the valve is in the position illustrated, flow of air from the pipe 135 into the valve chamber 130 is prevented. The port 133 communicates with the atmosphere and with the valve element 138 in the position shown any air within the bellows 124 above atmospheric pressure is permitted to vent through the pipe 129 and the port 133. The pressure within the bellows 124 is thereby relieved and the spring 125 accordingly urges this valve element to closed position. If now the valve element 138 is moved toward the left in which position it closes off the port 133 air under pressure flows through the pipe 135, valve chamber 130, and pipe 129 into the interior of the bellows 124. The bellows now expands and urges the valve 122 downwardly whereupon water is permitted to flow through the pipe 16.

For operating the valve 138 an arm 139 pivoted at 140 is connected to an armature 141 which cooperates with the solenoid 142. When the solenoid 142 is energized the armature 141 moves the arm 139 in a clock-wise direction which in turn moves the valve element 138 to the left in which position it closes off the bleed port 133. Upon deenergization of the solenoid 142 the arm 139 is moved in the other direction by means of the biasing spring 145 to the position illustrated wherein it opens the bleed port 133 and closes off the inlet port 132. It will now be understood that when the solenoid 142 is energized the valve 120 will be open and water will be permitted to flow through the pipe 16. Upon deenergization of the solenoid 142 the air will be vented from the bellows 124 and the valve 120 will therefore be closed.

The energization of the solenoid 142 is controlled by the relay 26 which may be identical with the relay shown in Figure 2 and may be controlled by the flow switch 35 and the manual switch 75 in exactly the same way as shown in Figure 2. Upon energization of the relay 26 in the manner set forth in the description of Figure 2, the arm 28 will be moved into engagement with the fixed contact 30 and current will flow through the solenoid 142 as follows: from the line wire 69 through conductor 150, the arm 28, contact 30, conductor 151, solenoid 142, and conductor 153 to the line wire 68. Accordingly it will be seen that whenever the relay 26 is energized, the solenoid 142 will be energized and the valve 120 will be opened. Upon deenergization of the relay 26 by the flow switch 35 in response to a flow of water to the pipe 15 as set forth in the description of Figure 2, or in the event of a failure of power supply the relay 26 will be deenergized whereupon the solenoid 142 will be deenergized and the valve 120 will be closed so that all the water in the system is available at the sprinklers 11. Since the relay 26 is normally held in by means of the holding circuit including the arm 29 and contact 31 it will be necessary in order to reopen the valve 120 after it has once been closed, to operate the manual switch 75.

It will now be apparent that in all the forms of invention which have been illustrated the flow of water to the air conditioning apparatus in the building and the other various water using appliances with the exception of sprinklers 11 is controlled by a single valve which is automatically closed in response to a continuous flow of water through the pipe 15 leading to the sprinklers for a certain length of time, which may be very short, or in the event of a failure in the power supply. This is accomplished by means of electrically operated valves in Figures 2 and 4 and by means of a pneumatically operated valve in Figure 5. In order to reopen the valves of any of these figures a manually operated normally open switch must be temporarily closed. It should be understood that the electrical means for operating the valves may take the form of solenoids or other conventional operating means.

It will now be seen that with the use of a relatively small amount of apparatus it is possible to avoid the necessity of replacing the water main in the building or of providing an additional water main where air conditioning apparatus or other apparatus which uses a relatively large amount of water is to be installed in a building equipped with a sprinkler system and which building was originally provided with a water main of insufficient size to simultaneously supply water to the sprinkler system and the additional water using appliances being installed in the building. Thus a great deal of time and expense in installing air conditioning apparatus in existing structures is saved without reducing the efficiency or sacrificing in the safety afforded by the sprinkler system.

While I have illustrated and described three preferred forms of my invention, many modifications may become apparent to those skilled in the art and it should therefore be understood that my invention is limited only by the scope of the appended claims.

I claim as my invention:

1. In a water distribution system of the type wherein a single water main supplies water to a building and wherein said main supplies water to a sprinkler system for the building and also to other water using appliances, the combination of valve means for controlling the flow of water to said other water using appliances only, an electrical control device, means responsive to energization of said control device for opening said valve means and for closing said valve means in response to deenergization of said control device, and means responsive to a flow of water to said sprinkler system for deenergizing said control device.

2. In a water distribution system of the type wherein a single water main supplies water to a building and wherein said main supplies water to a sprinkler system for the building and also to other water using appliances, the combination of valve means for controlling the flow of water to said other water using appliances only, an electrical control device, means responsive to energization of said control device for opening said valve means and for closing said valve means in response to deenergization of said control device, and means responsive to a continuous flow of water to said sprinkler system for a predetermined time for deenergizing said control device.

3. In a water distribution system of the type wherein a single water main supplies water to a building and wherein said main supplies water to a sprinkler system for the building and also to other water using appliances, the combination of valve means for controlling the flow of water to said other water using appliances only, an electrical control device, means responsive to energization of said control device for opening said valve means and for closing said valve means in response to deenergization of said control device, means responsive to a flow of water to said sprinkler system for deenergizing said control device, and means requiring manual attention for initially energizing said control device.

4. In a water distribution system of the type wherein a single water main supplies water to a building and wherein said main supplies water to a sprinkler system for the building and also to other water using appliances, the combination of valve means for controlling the flow of water to said other water using appliances only, an electrical control device, means responsive to energization of said control device for opening said valve means and for closing said valve means in response to deenergization of said control device, means responsive to a continuous flow of water to said sprinkler system for a predetermined time for deenergizing said control device, and means requiring manual attention for causing energization of said control device.

5. In a water distribution system of the type wherein a single water main supplies water to a building and wherein said main supplies water to a sprinkler system for the building and also to other water using appliances, the combination of valve means for controlling the flow of water to said other water using appliances only, motor means for controlling the position of said valve means, a relay controlling the energization of said motor and causing said motor to hold said valve means open only as long as said relay is energized, a normally closed switch in the circuit to said relay, and means responsive to a flow of water to said sprinkler system for causing the opening of said switch.

6. In a water distribution system of the type wherein a single water main supplies water to a building and wherein said main supplies water to a sprinkler system for the building and also to other water using appliances, the combination of valve means for controlling the flow of water to said other water using appliances only, motor means for controlling the position of said valve means, a relay controlling the energization of said motor and causing said motor to hold said valve means open only as long as said relay is energized, a normally closed switch in the circuit to said relay, means responsive to a flow of water to said sprinkler system for causing the opening of said switch, and time delay means for preventing opening of said switch until there has been continuous flow of water to said sprinkler system for a predetermined time.

7. In a water distribution system of the type wherein a single water main supplies water to a building and wherein said main supplies water to a sprinkler system for the building and also to other water using appliances, the combination of valve means for controlling the flow of water to said other water using appliances only, motor means for controlling the position of said valve means, a relay controlling the energization of said motor and causing said motor to hold said valve means open only as long as said relay is energized, a normally closed switch in the circuit to said relay, means responsive to a flow of water to said sprinkler system for causing the opening of said switch, and means requiring manual manipulation for causing energization of said relay after it has been deenergized.

8. A water distribution system comprising a single water main, a sprinkler system connected to said water main, other water using appliances also connected to said water main, said water main being of insufficient size to supply both the sprinkler system and the other water using appliances simultaneously with the necessary amount of water, valve means in control of the flow of water to said other water using appliances, and means responsive to a flow of water to said sprinkler system for causing closure of said valve means whereby all the water in said main flows to said sprinkler system when any of said sprinklers are in operation.

9. A water distribution system comprising a single water main, a sprinkler system connected to said water main, other water using appliances also connected to said water main, said water main being of insufficient size to supply both the sprinkler system and the other water using appliances simultaneously with the necessary amount of water, valve means in control of the flow of water to said other water using appliances, means responsive to a flow of water to said sprinkler system for causing closure of said valve means whereby all the water in said main flows to said sprinkler system when any of said sprinklers are in operation, and timing means for preventing closure of said valve means in response to a flow of water to said sprinkler system until there has been a continuous flow of water to the sprinkler system for a predetermined period of time.

10. A water distribution system comprising a single water main, a sprinkler system connected to said water main, other water using appliances also connected to said water main, said water main being of insufficient size to supply both the sprinkler system and the other water using appliances simultaneously with the necessary amount of water, valve means in control of the flow of water to said other water using appliances, valve positioning means in control of said valve means, switch means movable from a first circuit controlling position to a second circuit controlling position in response to a flow of water to said sprinkler system controlling said valve positioning means, and means responsive to movement of said switch means to the second circuit controlling position for causing said valve positioning means to move the valve means to closed position.

11. A water distribution system comprising a single water main, a sprinkler system connected to said water main, other water using appliances also connected to said water main, said water main being of insufficient size to supply both the sprinkler system and the other water using appliances simultaneously with the necessary amount of water, valve means in control of the flow of water to said other water using appliances, valve positioning means operatively connected to said valve means, switch means movable from a first circuit controlling position to a second circuit controlling position, a timer for moving said switch means from the first circuit controlling position to the second circuit controlling position in response to energization of said timer for a predetermined time, means responsive to a flow of water to said sprinkler system for energizing said timer, and means responsive to movement of said switch to the second circuit controlling position for causing the valve positioning means to move the valve means to closed position whereby flow of water to the other water using appliances is prevented.

12. In a water distribution system of the type wherein a single water main supplies water to a building and wherein said main supplies water to a sprinkler system for the building and also to other water using appliances, the combination of valve means for controlling the flow of water to the other water using appliances only, a movable control element normally in a first position, means responsive to a continuous flow of water to said sprinkler system for a predetermined time only for causing movement of said control device to a second position, and means responsive to movement of said control device to its second position for causing closure of said valve means.

13. In a water distribution system of the type wherein a single water main supplies water to a building and wherein said main supplies water to a sprinkler system for the building and also to other water using appliances, the combination of valve means for controlling the flow of water to said other water using appliances only, motor means operatively connected to said valve means and causing opening of said valve means in response to energization of said motor means, biasing means for causing closure of said valve means in response to deenergization of said motor means, and means responsive to a flow of water to said sprinkler system for causing deenergization of said motor means.

14. In a water distribution system of the type wherein a single water main supplies water to a building and wherein said main supplies water to a sprinkler system for the building and also to other water using appliances, the combination of valve means for controlling the flow of water to said other water using appliances only, electric motor means operatively connected to said valve means and causing opening of said valve means in response to energization of said motor means, biasing means for causing closure of said valve means in response to deenergization of said motor means, a switch controlling the circuit to said motor means, and means responsive to a continuous flow of water to said sprinkler system for a predetermined period of time only for causing opening of said switch whereby said motor is deenergized and said valve means prevents flow of water to said other water using appliances.

15. In a water distribution system of the type wherein a single water main supplies water to a building and wherein said main supplies water to a sprinkler system for the building and also to other water using appliances, the combination of valve means for controlling the flow of water to said other water using appliances only, motor means operatively connected to said valve means, said motor means including a pair of energizing circuits, means responsive to energization of one of said circuits for operating said means to open the valve means, means responsive to energization of the other of said circuits for operating the motor means to close the valve means, switch means in control of said circuits, and means causing operation of said switch means to energize the other of said circuits in response to a flow of water to said sprinkler system.

16. In a water distribution system of the type wherein a single water main supplies water to a building and wherein said main supplies water to a sprinkler system for the building and also to other water using appliances, the combination of valve means for controlling the flow of water to said other water using appliances only, a motor means operatively connected to said valve means, said motor means including a pair of energizing circuits, means responsive to energization of one of said circuits for operating said motor means to open the valve means, means responsive to energization of the other of said circuits for operating the motor means to close the valve means, switch means in control of said circuits, means causing operation of said switch means to energize the other of said circuits in response to a flow of water to said sprinkler system, and means requiring manual operation for causing energization of the first of said energizing circuits.

17. In a water distribution system of the type wherein a single water main supplies water to a building and wherein said main supplies water to a sprinkler system for the building and also to other water using appliances, the combination of valve means for controlling the flow of water to said other water using appliances only, fluid pressure operated means for causing opening of said valve means, means controlling the application of fluid pressure to said fluid pressure operated means, means biasing said valve means toward closed position, and means responsive to a flow of water to said sprinkler system for operating said controlling means to reduce the fluid pressure applied to the fluid pressure operated means to cause closure of the valve means whereby all of the water in said main is available for said sprinkler system.

18. In a water distribution system of the type wherein a single water main supplies water to a building and wherein said main supplies water to a sprinkler system for the building and also to other water using appliances, the combination of valve means for controlling the flow of water to said other water using appliances only, fluid pressure operated means for causing opening of said valve means, means controlling the application of fluid pressure to said fluid pressure operated means, means biasing said valve means toward closed position, and means responsive to a flow of water to said sprinkler system for operating said controlling means to reduce the fluid pressure applied to the fluid pressure operated means to cause closure of the valve means whereby all of the water in said main is available for said sprinkler system, said last named means including time delay means requiring a continuous flow of water to the sprinkler system for a predetermined period of time before operating the controlling means to reduce the fluid pressure applied to the fluid pressure operated means.

19. In a fire control system, a source of fluid supply, means connected thereto for conveying said fluid supply to said system, means connected to said source of fluid supply for receiving said fluid supply for uses other than fire control purposes, and means including valve means for automatically disconnecting said second named means from said source of supply upon the occurrence of a fire.

J. R. GINNATY.